Figure 1:
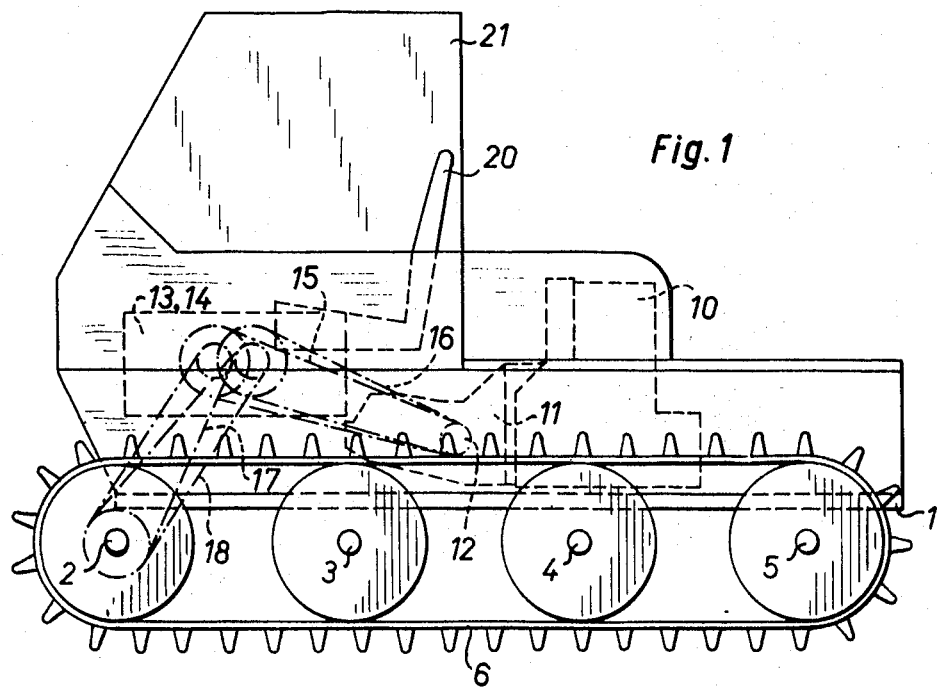

United States Patent

[11] 3,618,686

| [72] | Inventors | Paul A. Morsbach;<br>Klaus F. W. Leben, both of Bergedoff, Germany |
|---|---|---|
| [21] | Appl. No. | 883,133 |
| [22] | Filed | Dec. 8, 1969 |
| [45] | Patented | Nov. 9, 1971 |
| [73] | Assignee | Leben & Co. KG Vertrieb von Pistenpflegegeraten fur Skiabfahrten Munich, Germany |
| [32] | Priorities | Dec. 16, 1968 |
| [33] | | Germany |
| [31] | | P 18 14 880.5;<br>Feb. 10, 1969, Germany, No. P 19 06 457.4 |

[54] TRACKED VEHICLE
11 Claims, 5 Drawing Figs.

[52] U.S. Cl. ............................................. 180/6.7, 74/710.5
[51] Int. Cl. ....................................... B62d 11/10

[50] Field of Search............................................ 180/6.7, 6.2; 74/665 T, 710.5

[56] References Cited
UNITED STATES PATENTS
1,368,436  2/1921  Higinbotham...............  180/6.7 UX
FOREIGN PATENTS
1,110,867  2/1956  France .........................  74/665 T

*Primary Examiner*—Benjamin Hersh
*Assistant Examiner*—John A. Pekar
*Attorney*—Flynn and Frishauf ABSTRACT: A tracked vehicle, especially for over-snow use in mountainous terrain, particularly for preparing ski runs, is equipped with a steering system by positively driving the two endless tracks at different speeds by two intermediate gear systems controlled by the driver.

PAUL A. MORSBACH &
KLAUS F.W. LEBEN,
INVENTORS

TRACKED VEHICLE

The invention relates to a tracked vehicle for use in mountainous terrain, particularly for preparing, grooming, or improving ski runs.

Endless-track vehicles are usually steered by braking or stopping one of the tracks, the other track being still driven, causing the vehicle to describe a curve. Difficulties arise however when maneuvering on soft ground, particularly on snow, because the driving track tends to dig in. To overcome this difficulty it has been proposed to drive both tracks, when negotiating a curve, but to drive them at different speeds. The necessary mechanism is however exceedingly complex and moreover incapable of satisfying the requirements in practice for over-snow vehicles.

The principal object of the present invention is to provide an endless-track vehicle which has good steering properties even on soft ground or snow.

SUBJECT MATTER OF THE INVENTION

Two output shafts of a differential each drive; an individual intermediate gear system, each of which has at least one output shaft which rotates at a speed different from that of the input shaft of the intermediate gear system, each having at least 3 gears of which one has a different diameter than the others the two intermediate gear systems being connected together by two clutches each connecting a shaft of one of the intermediate drive system to a shaft of the other system, so that the vehicle can be steered by selectively engaging the one or the other of the two clutches.

Another object of the invention is to so construct the mechanism that ordinary commercially available engines, gear boxes and differential drives can be used so that the vehicle can be constructed at relatively low cost.

The invention provides a steering mechanism which allows one track to run at a different speed from the other, whereby both tracks are positively driven during steering.

Figure 2:
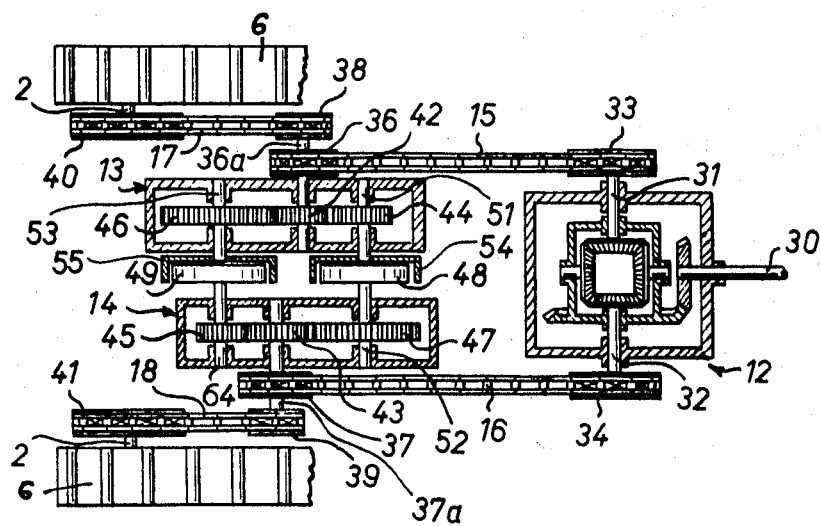
Figure 3:
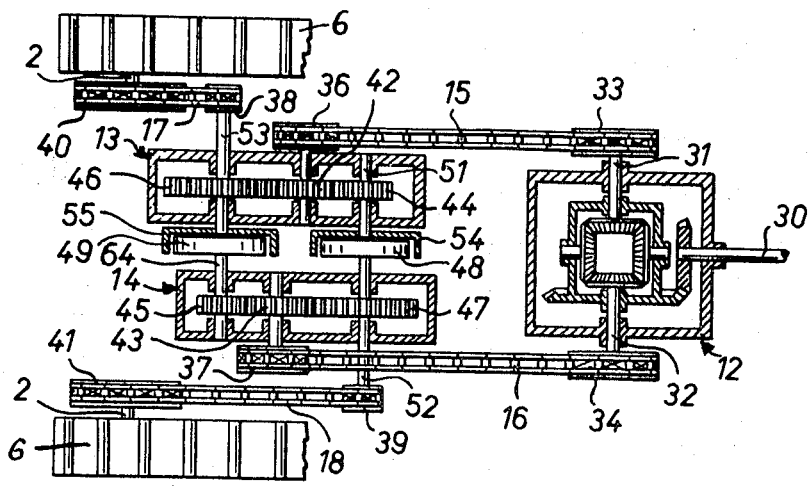
Figure 4:
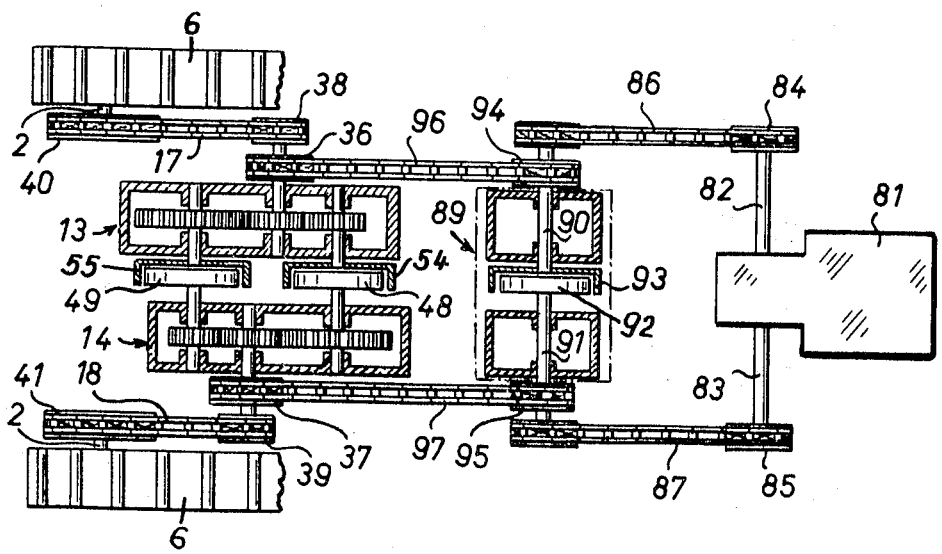
Figure 5:
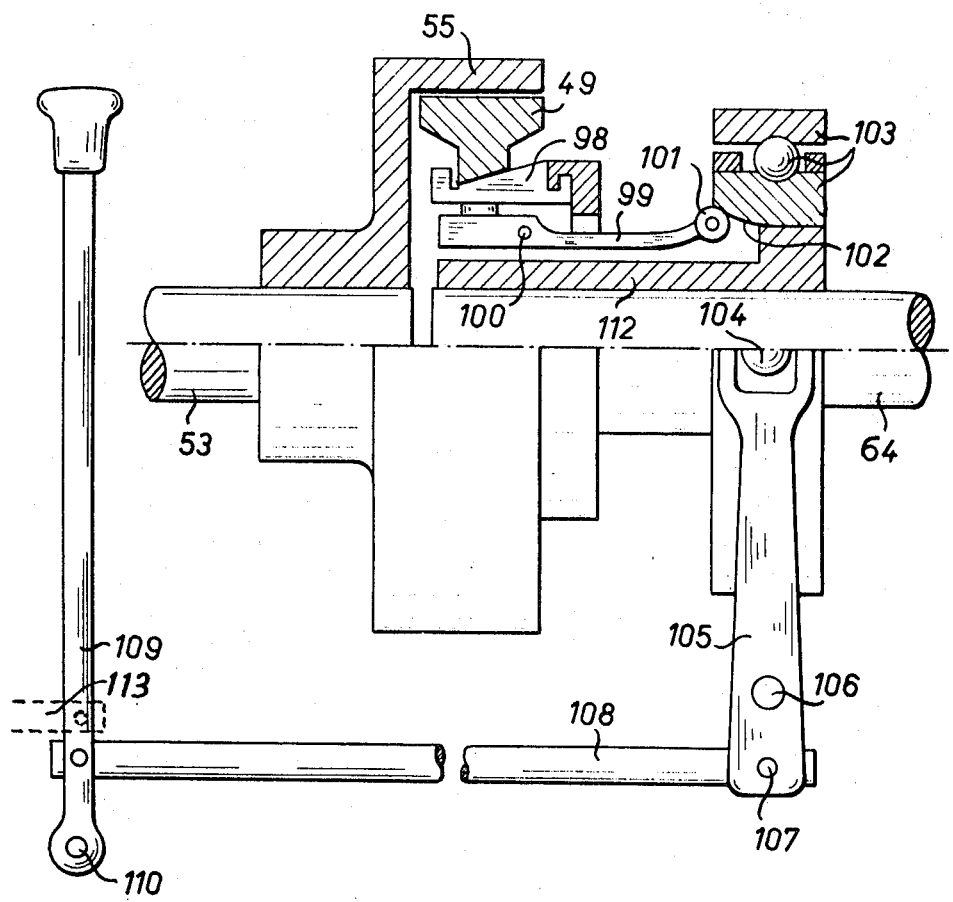

These and other objects of the invention will become apparent from the following description, having reference to the annexed drawing, wherein:

FIG. 1 is a side view showing diagrammatically a cross-country tracked over-snow vehicle, FIG. 2 is a sectional view showing diagrammatically a first example of the driving and steering system of the tracked vehicle according to the invention, FIG. 3 is a sectional view like that shown in FIG. 2 of a preferred version of the driving and steering system, FIG. 4 shows a sectional view like that shown in FIG. 2 but the driving and steering system being equipped with an auxiliary device which makes it easier to drive the vehicle transversely across a slope, FIG. 5 is a sectional view of a friction clutch together with a control lever.

The tracked or over-snow vehicle shown in FIGS. 1 and 2—which is particularly suitable for preparing and improving ski runs—has a chassis 1 supported at each side by a set of four half-axles 2, 3, 4, 5. Each half-axle supports the vehicle at one side only, that is to say the half-axles do not extend across the vehicle, and consequently the two endless-track treads 6 can be driven independently. Each of the front and rear half-axles 2, 5 supports a sprocket wheel for engaging the track. The wheels on the axles 3 and 4 are idler wheels equipped with pneumatic tires for guiding the tracks. The front sprocket wheels 40, 41 on both sides of the vehicle are driven by chains 17, 18, as will be explained in greater detail further as the description proceeds. Therefore at each side of the vehicle a track treads 6 passes over the idler wheels and over the driving sprocket or chain wheel fixed to the forward half-axle 2, the sprockets engaging with lugs on the track treads to drive the vehicle.

The chassis 1 supports an engine 10 of the vehicle, which is usually an ordinary, commercially available internal combustion engine. The engine 10 driving the vehicle through a gearbox 11 with a gearshift lever and a differential 12. These three parts, the engine 10, the gearbox 11 and the differential 12 are each preferably commercially available units as used in ordinary road vehicles and therefore well known.

The output shafts 31, 32 of the differential drive the sprocket wheels for the tracks 6 through two intermediate gear or drive systems 13, 14, the drive being transmitted through roller chains 15, 16 from sprocket wheels 33, 34 to sprocket or chain wheels 36, 37. The input shaft 30 of the differential 12 is driven by the gearbox 11.

The driver's seat 20 is arranged between the intermediate drive systems 13, 14 and is protected by a cabin 21. As the vehicle is intended for repairing and improving ski runs, primarily for compacting freshly fallen snow, the cabin is fully enclosed and can be heated.

FIG. 2 shows diagrammatically the driving and steering system. From the engine 10 drive is taken through a gearbox 11 to the input shaft 30 of the differential 12. The differential 12 is of well known conventional kind and need therefore not be described in detail here. Sprocket wheels 33, 34, are fixed to the two output shafts 31, 32 of the differential and drive two endless chains 15, 16, which in turn drive two sprocket wheels 36, 37 fixed to the half axles 36a, 37a, to which are also fixed two further sprocket wheels 38, 39. The sprocket wheels 38, 39 drive two endless roller chains 17, 18 which finally drive sprocket wheels 40, 41 fixed to the axles 2 of the caterpillar sprocket wheels of the tracks.

In FIG. 2 the intermediate gearing or drive system 13 is shown on the right, and the intermediate gearing or drive system 14 on the left, with respect to the direction of travel of the vehicle. Fixed to the shaft 36a of the right-hand intermediate drive 13 there is a gearbox wheel 42 which engages at diametrically opposite sides with two further gearwheels 44, 46. Similarly there is fixed to the shaft 37a of the left-hand intermediate drive 14 a gearwheel 43 which engages with a gearwheel 45 and a gearwheel 47 at diametrically opposite sides. The two gearwheels 43 and 45 preferably having the same diameter, but the gearwheel 47 preferably having twice the diameter as the gearwheels 43 and 45. The two intermediate gear transmissions 13 and 14 are mirror images of each other. The gearwheels 42, 44 46 and 43, 45, 47 are spur gears.

The shafts 51 and 52 to which the gearwheels 44 and 47 are fixed can be coupled together by a friction clutch 48, 54, and the two shafts 53, 64, to which the gearwheels 45 and 46 are fixed can be coupled together by a further friction clutch 49/55. The two friction clutches 48/54 and 49/55 are of the same construction, being preferably in the form of conventional expanding shoe brakes as shown in FIG. 5. The housings 54, 55 of these clutches are rigidly fixed to the shafts 51, 53 respectively, so that they rotate with these shafts.

Due to the different diameters of the gearwheels the driving sprocket 39, on the left, rotates twice as fast as the driving sprocket 38, on the right, when the clutch 48 is engaged, with the result that the vehicle describes a curve towards the right. On the other hand, engagement of the clutch 49/55, connecting the shafts 53 and 64, steers the vehicle towards the left.

The two clutches 48/54 and 49/55 are actuated through control levers 109 by the driver of the vehicle, who can if he desires slip the engagement somewhat, that is to say he need not engage the clutches fully each time, but only as much as is required. Each of the clutches 48/54 and 49/55 can be engaged by means of control levers 109, full actuation of such a lever giving a positive, no-slip engagement between the parts of the clutch and the shafts 53, 64, so that the vehicle follows a curve. The intermediate drives secures ensure that both tracks 6 are positively driven during steering operation, whereby a minimal demand is made on frictional adhesion between the tracks and the ground. This is a matter of importance when the vehicle is travelling over soft ground, particularly over snow or ice. Good steering qualities in vehicles of this kind can be obtained, because both tracks are positively driven all the time and not only one track is driven when the vehicle is being driven around a curve over mountainous terrain. Traction applied by a single active track is insufficient to propel the vehicle, because the driving track digs in and the driver losses control. In contrast to this, the double driving system according to the present invention ensures that drive is always positively applied by both tracks 6 of the vehicle. The differential drive 12 becomes active only if one or the other of the clutches 48/54 or 49/55 is engaged. Then the differential 12 allows the two shafts 36a and 37a to rotate at different speeds. In the present example when a clutch is fully engaged a speed ratio of 1:2 is obtained between the gearwheels 42 and 43, but in accordance with the invention any other speed ratio can be used if desired. If both clutches are engaged simultaneously a braking effect is obtained, because two different ratios cannot be applied at the same time.

Due to the way the intermediate drives 13, 14 are constructed the axles 36a and 37a are offset longitudinally in the vehicle and not coaxial, this difference in position being compensated by using roller chains 15, 16 and 17, 18 of different lengths.

FIG. 3 shows a preferred version of the invention. The construction is essentially the same as that of the version represented by FIG. 2, with the exception that the sprocket wheel 38 is not fixed to the shaft 36a, but rather to the shaft 53, and analogously the sprocket wheel 39 is not fixed to the shaft 37a but rather to the shaft 52. Apart from this the construction is the same and therefore the same parts have been given the same reference numbers in both figures. The changes made in FIG. 3 compared to FIG. 2, have the effect that a 1:2 speed reduction is obtained on sprocket wheels 38, 39. The final drive shafts 52 and 53 in FIG. 3 rotate at half speed compared to the intermediate drive shafts 42 and 43. The great practical advantage obtained is that the speed of the chain sprocket wheels is reduced and the chains 17, 18 themselves can travel at lower linear speeds. Therefore such an intermediate gearing is also a stepdown gearing.

In the example shown in FIG. 4 a power block 81 contains an internal combustion engine with a gearbox and a differential drive corresponding to the differential 12 in FIG. 2 or 3. Fixed to the ends of the two output shafts 82, 83 of the differential are sprocket wheels 84, 85, driving primary chains 86, 87 which transmit the power to cross-coupling clutch 89 or coupling box containing two coaxial transverse shafts 90 and 91 mounted to rotate in bearings and capable of being coupled together by means of a friction clutch 93. This clutch 93 is of the same type as clutches 48, 49. Chain sprockets wheels 94, 95 fixed to the shafts 90, 91 transmit power through roller chains 96, 97 to the two intermediate drives 13 and 14, which are similar in construction and function to the corresponding intermediate devices 13 and 14 of FIGS. 2 and 3. The two primary chains 86 and 87 in FIG. 4 correspond therefore to the primary chains 15, 16 in FIGS. 2 and the construction of the intermediate drives and the other driving and steering means is the same as in FIG. 2. During normal driving of the vehicle, that is to say straight-line driving, the clutch 93 is in the fully engaged position, so that the two half-shafts 90 and 91 rotate at the same speed and the two caterpillar-tracks 6 function synchronously, with the effect that the two tracks are locked together in their movements. This is important when the vehicle is transversing a slope because under these circumstances—if the differential is free to function—the vehicle tends to change course in the downhill direction. To remedy this and to keep the vehicle running straight, the driver would have to either accelerate the downhill track, or brake the uphill track. Both these remedies not only consume extra power but also produce a comparatively uneven or irregular ski run. It has been found in practice that this difficulty does not arise, or only to a negligible extent, if the two tracks are locked together in their movements by full engagement of the coupling 93 in FIG. 4.

For steering the vehicle only two steering levers are required each of which is connected to the cross-coupling clutch 93 and to one of the two steering clutches 48 or 49, the linkage being arranged so that actuation of one of the steering levers first disengages the clutch 93 and then engages the relevant steering clutch 48 or 49. When the vehicle is being driven straight ahead neither of the two steering levers are actuated. The cross-coupling clutch 93 is engaged and the two steering clutches 48 and 49 are disengaged and under these circumstances the vehicle proceeds on a straight path, the two tracks 6 moving synchronously, irrespective of whether the vehicle is travelling on level ground or tranversing a slope. The clutch 93 ensures that the two tracks function synchronously. When the driver wishes to change direction he actuates one of the two steering levers, with the result that first of all the cross-coupling clutch 93 is disengaged and then the relevant steering clutch 48 or 49 is engaged, producing a steering movement. It should be observed that the arrangement according to FIG. 4 of the invention allows the cross-coupling 93 to be engaged and disengaged without stopping the vehicle.

The clutch according to FIG. 5 relates to the clutch 49/55 in FIG. 2, but the clutches 48/54 in FIGS. 2 and 3 and 92/93 in FIG. 4 are of similar construction.

A clutch wheel 55 is rigidly fixed to the shaft 53. A friction shoe 49 is divided into a plurality of parts which can be moved in radial direction by pawl pins 98. These pawl pins 98 are actuated by levers 99 which are pivotally mounted on a bolt 100 in a jacket 102. The jacket 102 is fixed to the shaft 54 for transmitting the rotation, but it is movable in axial direction of the shaft 54 by a shift fork 105. The shift fork 105 is pivotally mounted on a bolt 106. One end of each lever 99 is equipped with a roller 101 which cooperates with a curved surface 102 of a roller bearing 103 fixed to the jacket 112. Two diametrically arranged collars 104 extending from the outer ring 103 are engaged by the shift fork 105, so that swiveling of the shift fork 105, the rollers 101 are rolled along the curved surface 102 and thereby the radial position of the shoes is influenced. At the other end of the shift fork 105 a lever 108 is fixed by a pin 107. The lever 108 is linked to a control hand lever 109 which can be manipulated by the driver of the vehicle. This control lever 109 is pivotally mounted on a pin 110. A further lever 113 for operating the clutch 92/93 can be fixed on the same lever 109. Therefore in the dirver's cabin 21 there are two control levers 109 for steering the vehicle.

Alternatively, instead of the driving sprocket wheels for the caterpillar-tracks being the front wheels of the vehicle they can if desired be the back wheels.

While there has been described and illustrated preferred embodiments of the above invention it is apparent that numerous alterations, omissions and additions may be made without departing from the spirit thereof. ACCORDINGLY,

We claim:

1. Tracked vehicle for use in mountainous terrain, particularly over-snow vehicle comprising
an engine (10);
a gearbox (11) for selecting different speeds;
a differential (12) having an input shaft connected with said gearbox (11) and a pair of output shafts;
at least two track treads (6); and
a steering system for the vehicle by driving the right and left side track treads at different speeds comprising
two intermediate gear systems (13, 14) each having an input shaft (36a, 37a) each connected to a respective output shaft (31,32) of the differential, each intermediate gear system (13,14) including three spur gears (42, 44, 46; 43, 45, 47), two of which are of respective predetermined diameters whereas the third (46,47) has a greater diameter than the other two, one of said spur gears (45 or 47) of the first of said intermediate gear systems (14) being coaxial with a spur gear (44 or 46) of different diameter of the second of said intermediate gear systems (13);
two clutches (48, 49) arranged between said intermediate gear systems, each of said coaxially arranged spur gears cooperating with a clutch (48,49) for connecting and disconnecting the transmission of power between the spur gears of unequal diameter to force the differential to supply output power of different speed at its output shafts;

an output shaft (52, 53) from the spur gear of greater diameter (46, 47) of each intermediate gear system (13,14) and means (38, 39, 17, 18) interconnecting said larger one of the spur gears of each intermediate gear system with a respective track tread for driving the track treads while the intermediate gear systems operate as a stepdown gearing.

2. Vehicle according to claim 1, wherein the input shafts (36a, 37a) of the intermediate gear systems (13, 14) are driven by chain means (15, 16) connected with the output shafts (31, 32) of the differential gearing (12).

3. Vehicle according to claim 1, including chain sprocket wheels (38, 39), fixed to each of the output shafts of the intermediate gear systems;

sprocket wheels (40, 41) connected to the driven shafts of the track treads (6);

chain means connecting said sprocket wheels (38, 39) on said output shafts (31, 32; 52, 53) with a sprocket wheel on the driven shafts of the track treads on each side of the vehicle, output shafts (36a, 37a; 52, 53) offset intermediate gear systems (13, 14) being offset relative to each other.

4. Vehicle according to claim 1, wherein the spur gear (42, 43) carried by the input shaft of each of said intermediate gear systems (13, 14) is directly meshing with the spur gear (46, 47) having the greater diameter.

5. Vehicle according to claim 1, comprising a further clutch (92, 93) having a pair of shafts (90, 91);

each shaft of said further clutch carrying further sprocket wheels (94, 95);

chain means (96, 97) to transmit force between said further sprocket wheels and the input shafts of said intermediate gear systems (13, 14) for driving both of said track treads synchronously in the connected position of said further clutch.

6. Vehicle according to claim 5, wherein said further clutch (92, 93) is actuated by the same control level (109) as the first and second of said clutches (48/54; 49/55), and controlled to be disengaged when either of said two clutches (48/54; 49/55) is placed in engagement.

7. Vehicle according to claim 1, including separate housings for the intermediate gear systems (13, 14) to house the gear systems separately and spaced from the housing of said differential gearing (12).

8. Vehicle according to claim 1, wherein the larger of the spur gears (46, 47) are staggered, with respect to the length of the vehicle.

9. Vehicle according to claim 8, wherein the intermediate gear systems (13, 14) are substantially similar, and relatively reversed, end for end, with respect to the length of the vehicle.

10. Vehicle according to claim 1, wherein the spur gears (42, 43) connected to the input shafts (36a, 37a) and the input shafts (36a, 37a) are staggered with respect to the length of the vehicle.

11. Vehicle according to claim 10, wherein the intermediate gear systems (13, 14) are substantially similar,, and relatively reversed, end for end, with respect to the length of the vehicle.

* * * * *